US012697854B2

(12) United States Patent
Ljungblad et al.

(10) Patent No.: US 12,697,854 B2
(45) Date of Patent: Aug. 4, 2026

(54) SYSTEM AND METHOD FOR MONITORING AND CONTROLLING AIR QUALITY IN A VEHICLE COMPARTMENT

(71) Applicant: Senseair AB, Delsbo (SE)

(72) Inventors: Jonas Ljungblad, Västerås (SE); Bertil Hök, Västerås (SE); Henrik Rödjegård, Näsviken (SE)

(73) Assignee: Senseair AB, Delsbo (SE)

( * ) Notice: Subject to any disclaimer, the term of this patent is extended or adjusted under 35 U.S.C. 154(b) by 466 days.

(21) Appl. No.: 18/259,193

(22) PCT Filed: Dec. 22, 2021

(86) PCT No.: PCT/SE2021/051308
§ 371 (c)(1),
(2) Date: Jun. 23, 2023

(87) PCT Pub. No.: WO2022/146222
PCT Pub. Date: Jul. 7, 2022

(65) Prior Publication Data
US 2024/0051370 A1 Feb. 15, 2024

(30) Foreign Application Priority Data
Dec. 30, 2020 (SE) .................................... 2051577-1

(51) Int. Cl.
B60H 1/00 (2006.01)
(52) U.S. Cl.
CPC ......... B60H 1/008 (2013.01); B60H 1/00778 (2013.01); B60H 1/00849 (2013.01)

(58) Field of Classification Search
USPC ..................................................... 454/69–165
See application file for complete search history.

(56) References Cited

U.S. PATENT DOCUMENTS

| | | | |
|---|---|---|---|
| 3,665,748 A | 5/1972 | Mator | |
| 5,429,805 A | 7/1995 | Uno et al. | |
| 5,728,927 A | 3/1998 | Ong | |
| 5,731,508 A | 3/1998 | Slemeyer | |

(Continued)

FOREIGN PATENT DOCUMENTS

| | | |
|---|---|---|
| CH | 712528 A2 | 12/2017 |
| CN | 1228839 A | 9/1999 |

(Continued)

OTHER PUBLICATIONS

International Search Report and Written Opinion mailed Feb. 17, 2022 in International Application No. PCT/SE2021/051308.

(Continued)

*Primary Examiner* — Ko-Wei Lin
(74) *Attorney, Agent, or Firm* — Knobbe, Martens, Olson & Bear, LLP

(57) ABSTRACT

The present invention relates to a system and method for monitoring and controlling air quality in a vehicle compartment. In particular the invention relates to a sensor unit determining at least two different substances present in the air of the vehicle compartment wherein the settings of a heat, ventilation and air conditioning system (HVAC-system) of the vehicle are controlled and optimized using at least one of the determined substances.

18 Claims, 8 Drawing Sheets

(56) References Cited

U.S. PATENT DOCUMENTS

| | | | |
|---|---|---|---|
| 6,883,651 B2 | 4/2005 | Fukaya | |
| 6,944,566 B2 | 9/2005 | Chen et al. | |
| 7,736,903 B2 * | 6/2010 | Lambert | G01N 1/2214 |
| | | | 436/167 |
| 7,845,206 B2 | 12/2010 | Wohltjen | |
| 7,966,104 B2 | 6/2011 | Srivastava et al. | |
| 9,846,117 B2 | 12/2017 | Zhou et al. | |
| 9,927,356 B2 | 3/2018 | Skibo | |
| 10,111,432 B2 | 10/2018 | Peng et al. | |
| 10,113,957 B1 | 10/2018 | Yi et al. | |
| 11,747,274 B2 | 9/2023 | Martin | |
| 2003/0109795 A1 | 6/2003 | Weber | |
| 2006/0047445 A1 | 3/2006 | Williams et al. | |
| 2006/0144061 A1 | 7/2006 | Badenhorst et al. | |
| 2009/0039267 A1 | 2/2009 | Arndt et al. | |
| 2009/0235720 A1 | 9/2009 | Smith | |
| 2010/0188232 A1 | 7/2010 | Lambert et al. | |
| 2011/0107813 A1 | 5/2011 | Guth et al. | |
| 2011/0213749 A1 | 9/2011 | Pichon | |
| 2012/0078532 A1 | 3/2012 | Forsyth et al. | |
| 2014/0026149 A1 | 1/2014 | Backensto et al. | |
| 2015/0241359 A1 | 8/2015 | Haveri et al. | |
| 2015/0373285 A1 | 12/2015 | Morris et al. | |
| 2016/0025404 A1 | 1/2016 | Zheng et al. | |
| 2016/0187897 A1 | 6/2016 | Peng et al. | |
| 2017/0254737 A1 | 9/2017 | Ke et al. | |
| 2018/0081330 A1 | 3/2018 | Haslett et al. | |
| 2018/0095028 A1 | 4/2018 | Jourdainne | |
| 2018/0120222 A1 | 5/2018 | Fritz et al. | |
| 2018/0120223 A1 | 5/2018 | Marta et al. | |
| 2018/0156766 A1 | 6/2018 | Zeng et al. | |
| 2018/0252699 A1 | 9/2018 | Dang | |
| 2019/0033274 A1 | 1/2019 | Makaram et al. | |
| 2019/0072489 A1 | 3/2019 | Camargo et al. | |
| 2020/0041158 A1 | 2/2020 | Turney et al. | |
| 2020/0346518 A1 | 11/2020 | Deliwala | |
| 2022/0092241 A1 | 3/2022 | Moradian et al. | |
| 2023/0236120 A1 | 7/2023 | You et al. | |
| 2023/0236168 A1 | 7/2023 | Granstam et al. | |
| 2023/0288091 A1 | 9/2023 | Bohlin | |
| 2023/0304924 A1 | 9/2023 | Rödjegård | |

FOREIGN PATENT DOCUMENTS

| | | | |
|---|---|---|---|
| CN | 1836154 A | 9/2006 | |
| CN | 101027615 A | 8/2007 | |
| CN | 101449143 A | 6/2009 | |
| CN | 102803936 A | 11/2012 | |
| CN | 105319176 A | 2/2016 | |
| CN | 105021777 B | 8/2016 | |
| CN | 106645587 A | 5/2017 | |
| CN | 107917484 A | 4/2018 | |
| CN | 108001221 A | 5/2018 | |
| CN | 108279719 A | 7/2018 | |
| CN | 108762086 A | 11/2018 | |
| CN | 110782640 A | 2/2020 | |
| CN | 111855897 A | 10/2020 | |
| EP | 2784485 A1 | 10/2014 | |
| GB | 2395259 A | 5/2004 | |
| GB | 2457660 A | 8/2009 | |
| JP | 2010210232 A | 9/2010 | |
| JP | 2021006755 A | 1/2021 | |
| KR | 10-2016-0112213 A | 9/2016 | |
| KR | 101720944 B1 | 4/2017 | |
| KR | 10-2019-0074506 A | 6/2019 | |
| SE | 531741 C2 | 7/2009 | |
| SE | 1950840 | 1/2021 | |
| WO | WO 1998/09152 A1 | 3/1998 | |
| WO | WO 2006/029920 A1 | 3/2006 | |
| WO | WO 2007/091043 A1 | 8/2007 | |
| WO | WO 2012/166585 A2 | 12/2012 | |
| WO | WO 2016/020422 A1 | 2/2016 | |
| WO | WO 2017/162917 A1 | 9/2017 | |
| WO | WO 2017/164953 A1 | 9/2017 | |
| WO | WO 2018/038491 A1 | 2/2018 | |
| WO | WO 2019/115473 A1 | 6/2019 | |
| WO | WO 2021/002796 A1 | 1/2021 | |

OTHER PUBLICATIONS

International Search Report and Written Opinion in PCT/SE2021/050119 dated Apr. 20, 2021 in 13 pages.

International Search Report and Written Opinion in PCT/SE2021/050647 dated Sep. 27, 2021 in 10 pages.

International Search Report and Written Opinion in PCT/SE2021/050841 dated Nov. 16, 2021 in 10 pages.

International Search Report and Written Opinion in PCT/SE2021/0510226 dated Jan. 18, 2022 in 10 pages.

International Search Report and Written Opinion in PCT/SE2021/051148 dated Dec. 8, 2021 in 10 pages.

International Search Report & Written Opinion mailed Jun. 23, 2022 in International Application No. PCT/SE2022/050574.

Office Action for Chinese Application No. 202180016930.4 dated Mar. 18, 2023 with translation in 17 pages.

Cited Provisions from Office Action for Chinese Application No. 202180016930.4 dated Mar. 18, 2023 in 1 page.

Cheng, et al., A New Distance Measure of Belief Function in Evidence Theory, IEEE Access, vol. 7, pp. 68607-68617, 2019.

Dong, et al., A Novel Multi-Criteria Discounting Combination Approach for Multi-Sensor Fusion, IEEE Sensors Journal, vol. 19, No. 20, pp. 9411-9421, 2019.

Hodgkinson et al., "Optical gas sensing: a review", Topical Review, Measurement Science and Technology, vol. 24 No. 1, pp. 1-95, 2013. doi: 10.1088/0957-0233/24/1/012004; figure 15; Section 4.

Ljungblad "High Performance breath alcohol analysis" Malardalen University Press Dissertations No. 240, 2017.

Ruano et al., Prediction of Building's temperature using neural networks models. Energy and Buildings, 2006, vol. 28, No. 6, pp. 682-694.

Wu et al., Sensor fusion Using Dempster-Shafer Theory, IEEE Instrumentation and Measurement, Technology Conference, pp. 7-12, 2002.

Wu et al., Sensor Fusion Using Dempster-Shafer Theory II: Static Weighting and Kalman Filter-like Dynamic Weighting, Instrumentation and Measurement, Technology Conference, pp. 907-912, 2003.

T. Wiezbicki and E. P. Ribeiro, "Sensor drift compensation using weighted neural networks," 2016 IEEE Conference on Evolving and Adaptive Intelligent Systems (EAIS) , 2016, pp. 92-97, doi: 10.1109/EAIS.2016.7502497. ; whole document.

Vaisala, Vaisala Carbocap® Technology for demanding environments, https://www.vaisala.com/en/vaisala-carbocapr-technology-demanding-environments.

Yang, et al., A new distance based total uncertainty measure in the theory of belief functions, Knowledge Based Systems 94, pp. 114-123, 2016.

Yong, et al., Combining belief functions based on distance of evidence, Decision Support Systems, 38, pp. 489-493, 2004.

Zhang, et al., Novel Algorithm for Identifying and Fusing Conflicting Data in Wireless Sensor Networks, Sensors, 14, pp. 9562-9581, 2014.

* cited by examiner b)

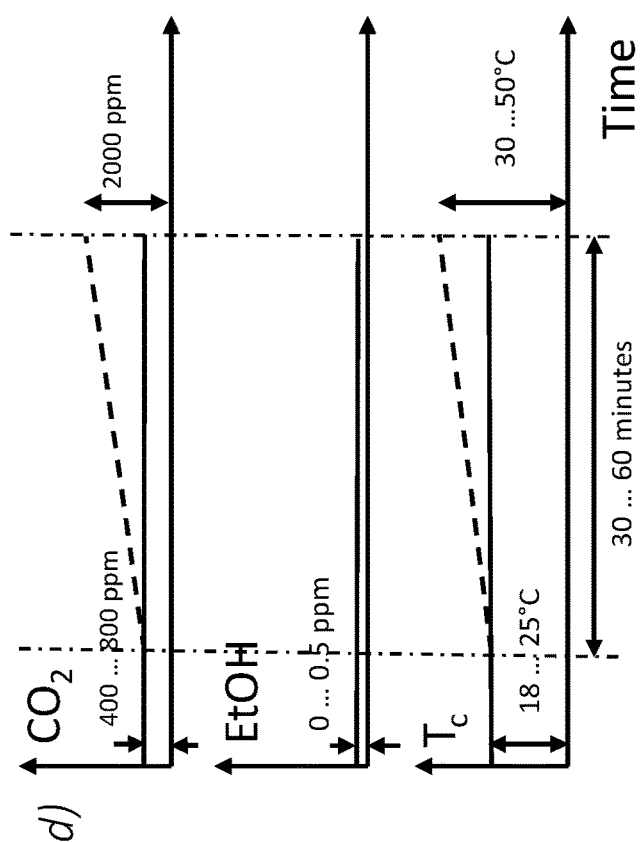
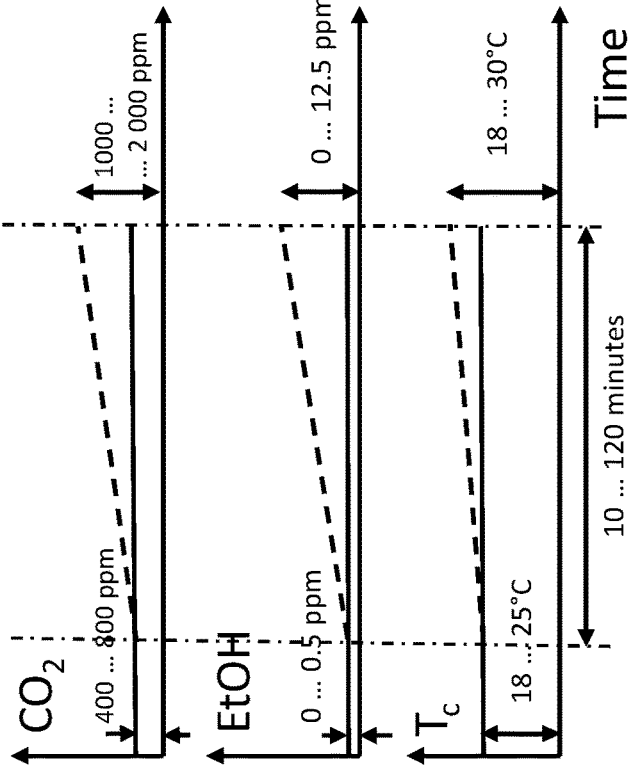
*Fig. 2c-d*

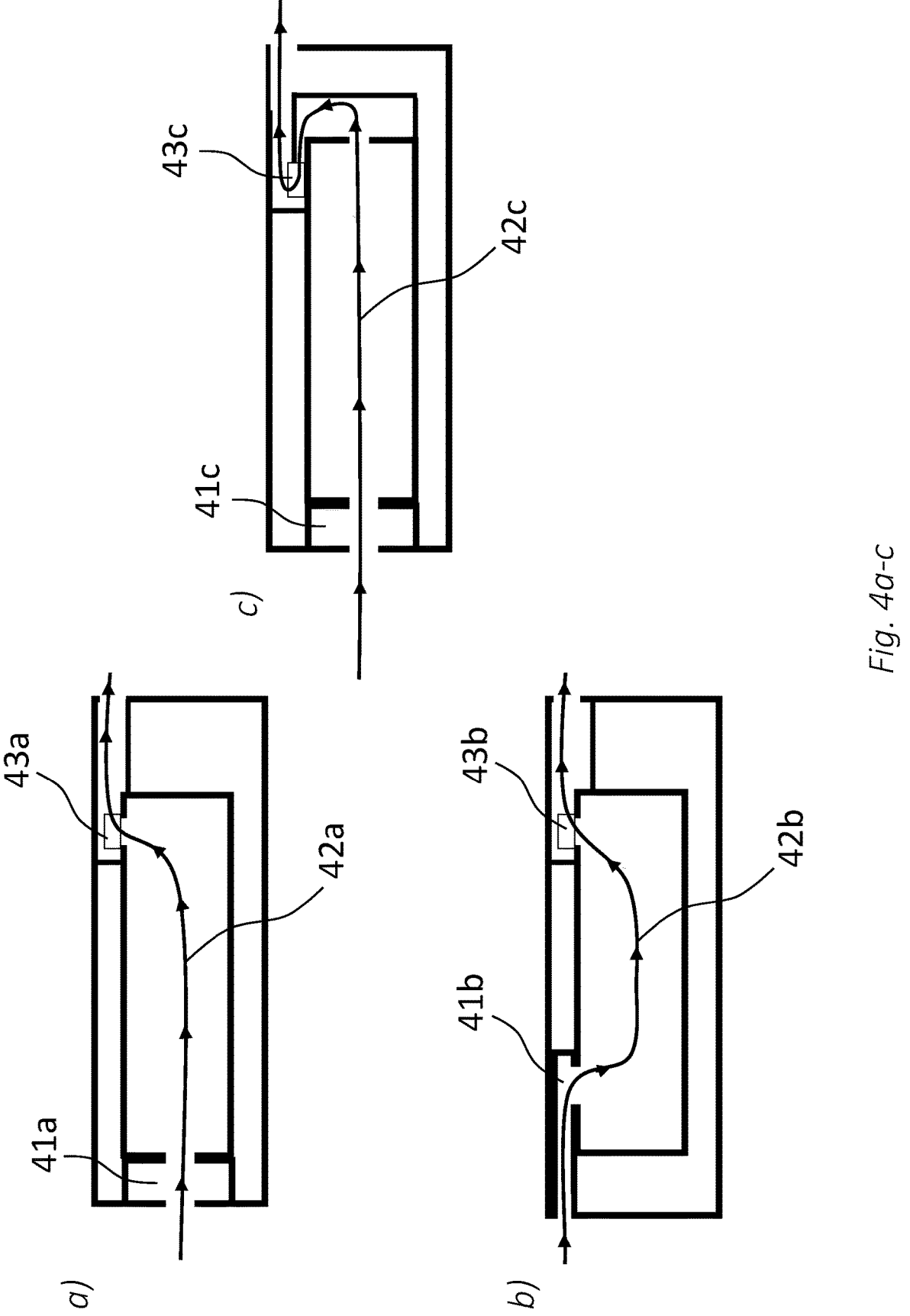
Fig. 4a-c

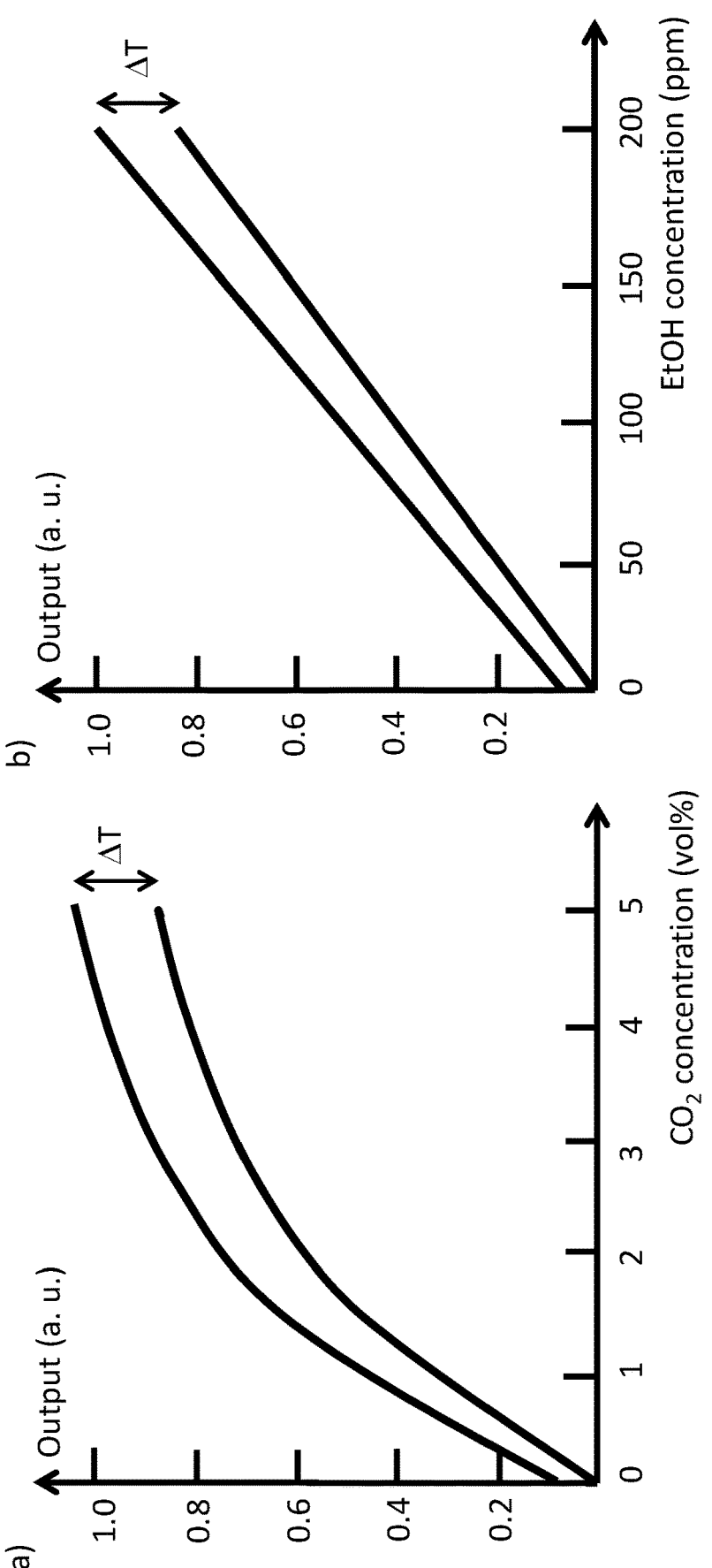
Fig. 5a-b

SYSTEM AND METHOD FOR MONITORING AND CONTROLLING AIR QUALITY IN A VEHICLE COMPARTMENT

FIELD OF THE INVENTION

The present invention relates to a system and method for monitoring and controlling air quality in a vehicle compartment. In particular the invention relates to determining at least two substance concentrations relating to the air quality of the vehicle compartment and wherein the operation of a heat, ventilation and air conditioning system (HVAC-system) will be at least partly dependent on the determined substance concentrations.

INCORPORATION BY REFERENCE

The patent applications SE1950840 and PCT/SE2020/050690 by the same applicant are hereby incorporated by reference.

BACKGROUND OF THE INVENTION

Breath analyzing equipment for analyzing occurrences and concentration of intoxicating substances in a person's breath is becoming increasingly common, not at least in vehicles as a measure to detect and prevent driving under the influence of intoxicating substances. The main focus is ethanol (ethyl alcohol/drinking alcohol) detection, commonly referred to as BrAC (breath alcohol concentration), but also other substances are of interest. The breath analyzing equipment mounted in vehicles typically gives a measured value of the content of a substance or substances in the driver's breath, which in turn, to a high accuracy, relates to the concentration in the blood of the user. The breath analyzing equipment may be part of a system also including equipment for identifying the driver and/or immobilizing the vehicle, so called "alcolocks". Such breath analyzing equipment is typically permanently mounted in the vehicle and may be an integral part of the dashboard, for example, and connected to the control system of the vehicle. Up to date, such systems have been found primarily in commercial vehicles like buses, taxis and trains. However, it appears that these systems will also be common in private vehicles in a near future, and possibly also mandatory in at least some countries and regions.

The most common approach for vehicle mounted breath testing equipment is to use a mouthpiece to which, after a deep breath, the user should empty his or her airways. This approach is referred to as active detection. To ensure a correct determination the user should deliver a forced expiration at almost full vital capacity. This requires substantial time and effort, especially for persons with limited capacity. In addition, the mouthpiece, or part of the mouthpiece, is often a disposable plastic item for hygienic reasons. This results in cumbersome handling and the use of vast amounts of disposable plastic items, which would be the case if alcolocks become mandatory, is questionable from an environmental viewpoint.

An alternative approach is so called passive detection wherein the intoxicating substance is determined from a breath sample taken during the expiration at normal breathing. Disposable mouthpieces are typically not used. However, the user may be instructed to breathe towards an air inlet or the like. The challenge with passive detection is the low concentration of the substances to be detected and analyzed. An established method is to utilize tracer gases, typically carbon dioxide or water vapor, which are always present in the breath in highly predictable amounts, to both trigger the analysis of the target substance and to facilitate the determination of the target substance concentration value. A further problem, not at least in vehicles, is the uncontrolled environment in the vehicle compartment that includes forced ventilation, the use of air conditioning, (AC) systems etc. A still further problem is, if more than the driver is present, to determine if the detected intoxicating substance comes from the driver or from a passenger.

WO2017164953 discloses a method and a system for passive breath alcohol concentration measurement using tracer gas detection to facilitate the determination of the target substance concentration value and introduces a method and system to switch from a passive detection to an active detection if required. This also includes instructing a driver to take certain actions.

U.S. Pat. No. 7,736,903 discloses a method and a system for passive breath alcohol concentration measurement and discusses the influence of the settings of the HVAC to the ability to perform accurate BrAC measurements.

In parallel to the recent interest in hindering an intoxicated driver from driving the vehicle there has been a growing concern about the air quality in the vehicles compartment and how the quality of the air affects the driver's abilities. Traditionally the focus has been on temperature alone and automated air conditioning systems have been around for a long time, which more or less effectively regulates the settings of the HVAC system to a predetermined set-temperature. Recently also the concentration of carbon dioxide, $CO_2$, has come into attention since an elevated carbon dioxide level over a prolonged time may cause drowsiness of the driver, or at least slow down reactions. At the same time there is a strong drive to not "over-ventilate" the vehicle compartment since the HVAC systems are highly energy consuming and adversely affects the fuel economy and/or the operation range of the vehicle.

A further area of great concern is often referred to as the "child left behind scenario", wherein a child or an animal by mistake is left in the vehicle compartment while parking. A large number of deaths or injuries relates to this scenario worldwide each year. The fast temperature increase that may occur in a parked vehicle parked in the sun typically represents the highest danger, but also the build-up of the carbon dioxide level in the compartment may be dangerous. Further, to monitor the carbon dioxide has been suggested as a way to detect the presence of children or animals left behind in the vehicle and to automatically issue an alarm and/or take prevent actions such as unlock the vehicle, for example.

US2020346518 discloses a method and a system for detecting infants or small animals left behind in the car and also to automatically regulate the ventilation to keep the carbon dioxide level in the vehicle compartment within a reasonable limit. The insights regarding the danger of intoxicating substances in combination with driving, the importance of the air quality of the vehicle comportment and how to prevent "child left behind" have improved and systems and methods addressing these issues represents important achievements. However, existing equipment and systems are often complex and costly both to install and maintain and typically not well integrated with each other systems in the vehicle. Hence there is a reluctancy to invest and install these systems.

In addition, the use of several sensor devices designed for specific applications may not be cooperating adequately, and different systems may have objectives that is at least partly being conflict with each other. One example of different objectives that needs to be well balanced is in-vehicle air quality in relation to energy consumption of the HVAC system. The energy consumption of the HVAC system has a direct impact on the fuel consumption in the case of combustion engines and the drive range of a battery operate car.

SUMMARY OF THE INVENTION

The object of the invention is to provide an air quality monitor and control system comprising a sensor unit and a HVAC system and method of operation that overcomes the drawbacks of prior art methods and systems. In particular, during active use of the vehicle a balance between fuel economy or drive range and driver vigilance is of high importance. Then the vehicle is parked the system should be capable of detecting if someone is in the vehicle and adjust the parameters of the HVAC, for example.

This is achieved by the air quality monitor and control system as defined in claim 1, and the method as defined in claim 10.

According to a first aspect of the invention a vehicle mounted combined system for monitoring and controlling air quality of a vehicle compartment and for determining of an intoxicating target substance relating to the driver/user of the vehicle is provided. The combined system comprises:

a sensor unit arranged to analyze air from the compartment and to determine the concentration of a target substance and the concentration of carbon dioxide in an air sample, and wherein the sensor unit is arranged to use carbon dioxide as a tracer substance to determine the breath concentration of a target substance;

a heat, ventilation and air conditioning system, a HVAC-system, arranged to have at least one air intake mode drawing external air into the vehicle compartment and one recirculation mode circulating air in the vehicle compartment and the HVAC system comprising means to regulate the flow and amount of intake air by changing the setting of parts of the HVAC system;

a central control unit arranged to control both the sensor unit and the HVAC system, and wherein the central control unit is arranged to set the HVAC system and the sensor unit in at least two different modes of operation:

a pre-drive mode comprising determination of the breath concentration of a target substance in an air sample using carbon dioxide as a tracer substance;

at least a second mode wherein the air quality of the vehicle compartment is monitored and at least partly controlled by performing carbon dioxide determination and controlling the settings of the HVAC system at least partly based on the carbon dioxide determination; and wherein the sensor unit is arranged to during the pre-drive mode determine the concentration of a target substance in an air sample using carbon dioxide as a tracer substance and during, and during second mode the sensor unit is arranged to provide a measure of the air quality of the vehicle compartment by determining the carbon dioxide concentration.

According to one embodiment of the invention the second mode is a drive mode and initiated only if the determined target substance concentration determined in the pre-drive mode is below a predetermined level.

According to one embodiment of the invention a further mode is provided, the park mode wherein the air quality of the vehicle compartment is monitored and at least partly controlled by performing carbon dioxide determination with the same sensor unit and controlling the settings of the HVAC system at least partly based on the carbon dioxide determination performed during the park mode.

According to one embodiment of the invention the drive mode comprises the central control unit controlling the HVAC system to increase the external air intake if the determined carbon dioxide level is above a first predetermined upper level, and reduce the external air intake if the carbon dioxide level is below a first predetermined lower level. The drive mode may further comprises the central control unit activating an alarm function if the HVAC system is not capable of maintaining the carbon dioxide level below the first predetermined upper level.

According to one embodiment of the invention the park mode comprises the central control unit controlling the HVAC system to increase the external air intake if the determined carbon dioxide level is above a second predetermined upper level, and reduce the external air intake if the carbon dioxide level is below a second predetermined lower level. The park mode may further comprise the central control unit being arranged to monitor the status of a battery suppling the HVAC system with power and activating an alarm function if the battery status indicates that the power will not be enough to maintain the HVAC system at the present setting required for maintaining the carbon oxide level below the second upper limit.

According to one embodiment of the invention the park mode comprises the central control unit activating an alarm function if the HVAC system is not capable of maintaining the carbon dioxide level below the second predetermined upper level.

According to one embodiment of the invention the sensor unit comprises a temperature sensor and the temperature of the air in the vehicle compartment is determined using the sensor unit and the setting of the HVAC system will depend on both the determined temperature and the determined carbon dioxide level.

According to one aspect of the invention a method of operating a vehicle mounted combined system for monitoring and controlling air quality of a vehicle compartment and for determining of an intoxicating target substance relating to the driver/user of the vehicle is provided. The combined system utilized by the method comprises:

a sensor unit arranged to analyze air from the compartment and to determine the concentration of a target substance and the concentration of carbon dioxide in an air sample, and wherein the sensor unit is arranged to use carbon dioxide as a tracer substance to determine the breath concentration of a target substance;

a heat, ventilation and air conditioning system, HVAC-system, arranged to have at least one air intake mode drawing external air into the vehicle compartment and one recirculation mode circulating air in the vehicle compartment and the HVAC system comprising means to regulate the flow and amount of intake air by changing the setting of parts of the HVAC system, and a central control unit arranged to control both the sensor unit and the HVAC system, and wherein the central control unit is arranged to set the HVAC system and the sensor unit in at least two different modes of operation.

The method comprises the modes of operation of:

a pre-drive mode comprising determination of the breath concentration of a target substance in an air sample using carbon dioxide as a tracer substance using the sensor unit;

at least a second mode wherein the air quality of the vehicle compartment is monitored and at least partly controlled by performing carbon dioxide determination and using the same sensor unit and controlling the settings of the HVAC system at least partly based on the carbon dioxide determination.

According to one embodiment of the invention the second mode is a drive mode initiated only if the determined target substance concentration determined in the pre-drive mode is below a predetermined level.

According to one embodiment of the invention a park mode is further provided wherein the air quality of the vehicle compartment is monitored and at least partly controlled by performing carbon dioxide determination with the same sensor unit and controlling the settings of the HVAC system at least partly based on the carbon dioxide determination performed during the park mode.

According to one embodiment of the invention the drive mode comprises the central control unit controlling the HVAC system to increase the external air intake if the determined carbon dioxide level is above a first predetermined upper level and reduce the external air intake if the carbon dioxide level is below a first predetermined lower level. The drive mode may comprise the central control unit activating an alarm function if the HVAC system is not capable of maintaining the carbon dioxide level below the first predetermined upper level. According to one embodiment of the invention the park mode comprises the central control unit controlling the HVAC system to increase the external air intake if the determined carbon dioxide level is above a second predetermined upper level, and reduce the external air intake if the carbon dioxide level is below a second predetermined lower level. The park mode may comprise the central control unit monitors the status of a battery suppling the HVAC system with power and activating an alarm function if the battery status indicates that the power will not be enough to maintain the HVAC system at the present setting required for maintaining the carbon oxide level below the second upper limit. In the the park mode the central control unit may activate an alarm function if the HVAC system is not capable of maintaining the carbon dioxide level below the second predetermined upper level.

According to one embodiment of the invention the sensor unit provides the temperature of the air in the vehicle compartment and the setting of the HVAC system will depend on both the determined temperature and the determined carbon dioxide level.

One advantage of the invention is that the same sensor unit may be utilized to determine the concentration of an intoxicating substance relating to the driver and to monitor and control the air quality in the vehicle compartment, not only in the running vehicle, but also when it is being parked. Such improved control may be useful from aspects of safety, health and economy.

One advantage of the invention is that the operation of the HVAC system may be balanced with the requirement of maintaining the carbon dioxide level in the vehicle compartment below a predefined level thereby limiting the effects on the vehicle's operating mileage range.

One further advantage is that the air quality monitor and control system may be operated in a plurality of different modes representing different usage of the vehicle including a pre-drive mode, a drive mode and a park mode.

In the following, the invention will be described in more detail, by way of example only, with regard to non-limiting embodiments thereof, reference being made to the accompanying drawings.

BRIEF DESCRIPTION OF THE DRAWINGS

FIG. 4a-c are schematic illustrations of different embodiments of the sensor unit according to the present invention; and FIG. 5 a-b are graphs showing the signal characteristics of the sensor unit with respect to a) $CO_2$ and b) alcohol measurement.

DETAILED DESCRIPTION

Figure 1:
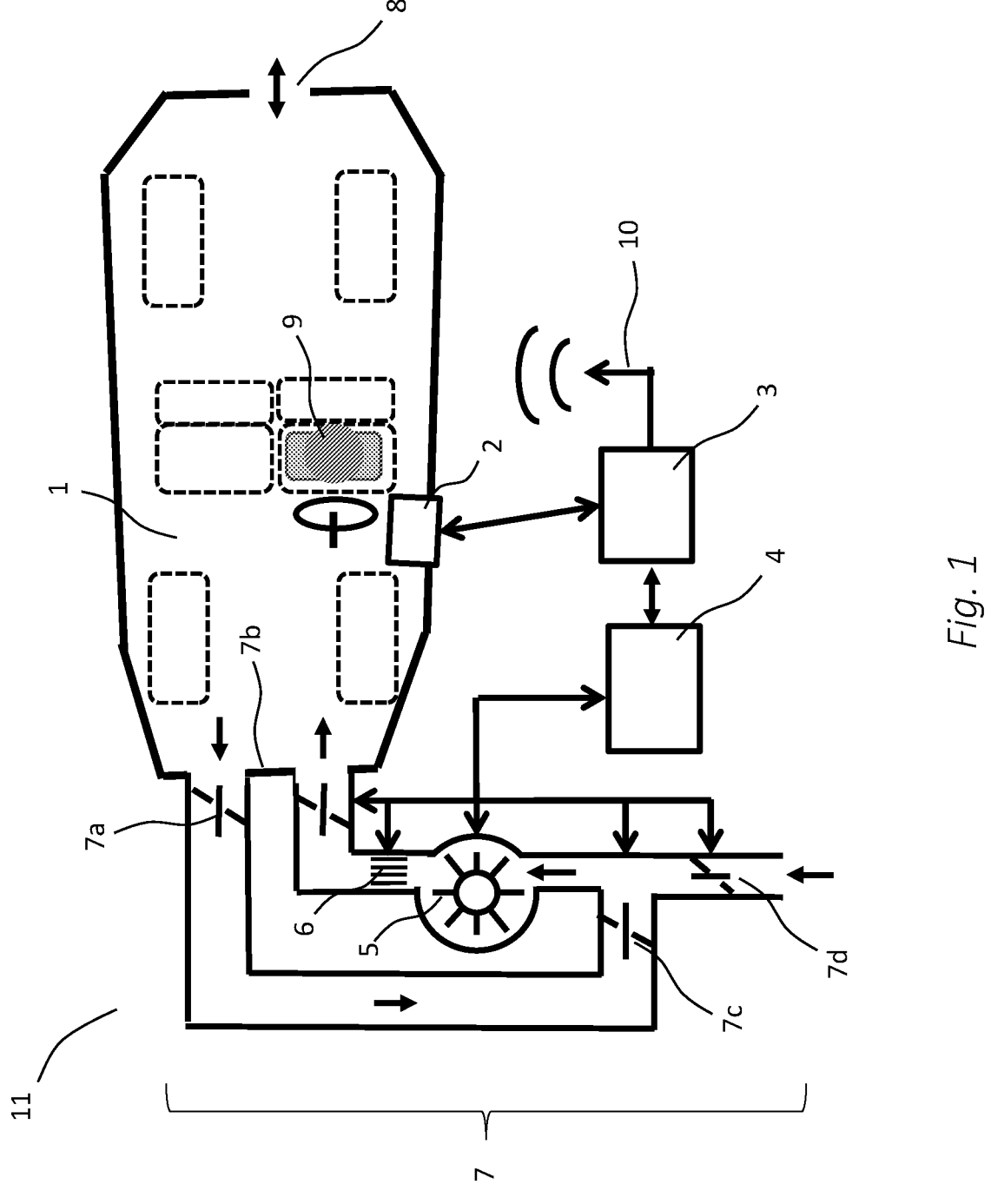
FIG. 1 is a schematic illustration of the air quality monitor and control system according to the present invention; in different modes of operation, a) an open mode and b) a closed mode.

Terms such as "top", "bottom", upper", lower", "below", "above" etc. are used merely with reference to the geometry of the embodiment of the invention shown in the drawings and/or during normal operation of the described device and system and are not intended to limit the invention in any manner.

The term "breath concentration of a target substance" is used to describe that a concentration measure of the substance is made in a breath sample and through calculations, typically involving a tracer substance such as carbon dioxide or water, a breath concentration of a tested person may be determined. The breath concentration typically suitable to compare with legal concentration limits and/or compare with blood concentrations of the target substance. The use of breath concentrations of for example alcohol is well established, the so called BrAC-value, which will be further discussed below.

In the description an example below the intoxicating substance will be exemplified with ethyl alcohol (EtOH). However, the invention is, as appreciated by the skilled person, not limited to EtOH and the described system and method may easily be adapted to other intoxicating substances.

In the description the power supply to the HVAC system, sensor unit, control unit is exemplified with a battery. A battery should be interpreted as any means capable of storing and supplying electrical power including but not limited to chemical batteries, super capacitors and fuel cell systems.

According to a first aspect of the invention a vehicle mounted combined system for monitoring and controlling air quality of a vehicle compartment and for determining of an intoxicating target substance relating to the driver/user of the vehicle is provided. The combined system, schematically illustrated in FIG. 1, comprises:

a sensor unit 2 arranged to analyze air from the compartment and to determine the concentration of a target substance and the concentration of carbon dioxide in an air sample, and wherein the sensor unit is arranged to use carbon dioxide as a tracer substance to determine the concentration of a target substance;

a heat, ventilation and air conditioning system 7, HVAC-system, arranged to have at least one air intake mode drawing external air into the vehicle compartment and one recirculation mode circulating air in the vehicle compartment and the HVAC system comprising means to regulate the flow and amount of intake air by changing the setting of parts of the HVAC system. The HVAC system typically comprises a HVAC control unit 4.

a central control unit, CCU 3, arranged to be connected to and to control both the sensor unit 2 and the HVAC system 7. The central control unit is arranged to set the HVAC system 7 and the sensor unit 2 in at least two different modes of operation, illustrated in FIG. 2*a:*

1) a pre-drive mode wherein the sensor unit performs a determination of the concentration of a target substance in an air sample using carbon dioxide as a tracer substance normally existing in the exhaled air from a human being; and 2) at least a second mode wherein the air quality of the vehicle compartment is monitored and at least partly controlled by performing carbon dioxide determination and controlling the settings of the HVAC system at least partly based on the carbon dioxide determination. The same sensor equipment, the sensor unit 2 is utilized in at least the pre drive mode and the second mode.

According to one embodiment of the invention the second mode is a drive mode and initiated only if the determined target substance concentration determined in the pre-drive mode is below a predetermined level.

According to one embodiment of the invention a further mode is provided, the park mode, wherein the air quality of the vehicle compartment is monitored and at least partly controlled by performing carbon dioxide determination with the same sensor unit and controlling the settings of the HVAC system at least partly based on the carbon dioxide determination performed during the park mode. The park mode differs from the two previous modes by the absence of a driver, focusing on the possible presence of a child or a pet accidently left behind. Detection is enabled by monitoring the compartment $CO_2$ concentration, and the risk of a life-threatening situation due to heat by monitoring of the compartment temperature. The HVAC system may mitigate a dangerous development up to the point of its capability. At this point an alarm signal may be generated to call for the attention of other people.

According to one aspect of the invention a method of operating the combined system according to the above is provided.

The system and the method according to one embodiment of the invention is designed to operate in three distinctive modes, a pre-drive mode, a drive mode, and a park mode. The three modes have different objectives and requirements, but utilizes the same measurement equipment, sensor unit 2, and the same basic measurement principles. This makes the different modes possible to implement with a minimum of additional hardware compared to prior art systems.

A major objective of the pre-drive mode is to check the sobriety of the driver immediately upon entering the driver's seat. This task is performed by means of a sensor unit located close to this position, and capable of quantitative analysis of the concentration of ethyl alcohol (EtOH) in relation to expired concentration of carbon dioxide ($CO_2$). A sensor unit capable of accurate measurement and monitoring of EtOH and $CO_2$ is key to this mode of operation.

In the drive mode it is still possible to check driver breath alcohol concentration by passive monitoring or by requesting a directed breath towards the sensor unit. In addition, there are two more objectives of the system in which the operation of the sensor unit is critical. One objective is related to cognitive function of the human brain which may be deteriorated by poor air quality. Already at moderately increasing $CO_2$ concentration from the normal background of 400 ppm, at slightly above 1000 ppm there are signs of deteriorated human performance of cognitive tasks, and this deterioration increases rapidly at higher concentrations. There is also a co-variation with temperature. Therefore, it is important to control the ventilation within a vehicle to maintain adequate air quality. This objective can be fulfilled by using compartment $CO_2$ concentration and temperature to control the HVAC system of the vehicle. On the other hand, the HVAC system is highly power consuming. Therefore, operating it at maximum capacity will set a limit to the vehicle's operating range. To save energy, there is a need to balance these opposing requirements during the drive mode. Access to the difference between compartment and outside temperature and $CO_2$ recordings may be important to manage these opposing requirements. However, according to the present invention signals from one specific sensor unit is utilized in multiple common situations, before, during and after driving sessions. Other sources of information may be employed when necessary.

The park mode of operation will be important in the cases of a child or a pet behind in the vehicle when the driver leaves it. By monitoring temperature and $CO_2$, both can be used to activate the HVAC system and maintain adequate control of air quality and compartment temperature within safe and comfortable limits.

FIG. 1 is a schematic illustration of the air quality monitor and control system 11 according to the invention. The system includes a vehicle compartment 1 which typically includes seats for the driver and possibly passengers.

The air quality within the compartment is primarily determined by the concentration of carbon dioxide ($CO_2$) and temperature which both should be kept within a predefined interval based on standards of safety and comfort for the vehicle occupants. A sensor unit 2 is included to measure these entities at one or several representative locations within the compartment 1.

The sensor unit 2 is further adapted to measure the concentration of an intoxicating substance, for example ethyl alcohol (EtOH). According to the invention the same sensor unit 2 is used for all modes of operation and adapted to output concentration of an intoxicating substance, concentration of $CO_2$ and temperature. This puts high demands on the sensor unit in terms of detectable concentration ranges, speed of detection and the ability of producing reproducible and reliable results under varying conditions. The requirements is further discussed below. Sensors based on IR technology are suitable for the system and method according to the invention. Suck sensors are commercially available from for example Senseair AB, Sweden.

The sensor unit 2 is preferably located close to the driver position 9 within the compartment 1, whereby its response to increasing $CO_2$ and/or EtOH concentration will be mainly determined by the respiratory activity of the driver, rather than passengers located more remotely. The actual location of measurement may be selected by one or several ducts through which air at specific points within the compartment 1 may be connected to the sensor unit 2. Continuous air sampling is drawn through the sensor unit 2 by means of a pump or a fan. Thereby the continuous monitoring of $CO_2$, EtOH and temperature will represent the corresponding local air properties in the close vicinity of the driver as a function of time.

A control and communication unit, CCU, 3 is adapted to exchange control and sensor signals with sensor unit 2. The CCU is typically a multipurpose digital processor including an arithmetical and logical unit for implementing logic, sequential algorithms of high complexity, memory devices for temporary and permanent storage of digital data, and interface circuitry to enable control signals to be read by several peripheral units. A transceiver 10 may be connected to the control and communication unit 3 for exchange of data or messages between the system and some external units, preferably by wireless two-way communication.

An HVAC system 7 for temperature and air quality control is schematically depicted, for functional clarity and is not in physical scale. The control and communication unit 3 is providing command signals to an HVAC control unit 4 which in turn is controlling a fan 5, a heating and cooling unit 6, a plurality of valves 7a-d to control air flow to and from the compartment 1, and also for adjusting the ratio between recirculating air and air exchange with the outside environment. A separate opening 8 may be provided between the vehicle compartment 1 and the external environment. As appreciated by the skilled person a HVAC system may be designed and implemented in various way, but the basic parts and functions will be similar.

The fan 5 may typically have a capacity to fully replace the entire compartment with air taken from the outside environment within one minute, when valves 7b, 7d are fully open, while 7a, 7c are closed. The opposite setting, 7a/7c open and 7b/7d closed is used when full recirculation is mandated. Preferably, all valves 7a-d can be proportionately controlled, enabling the proportion of flow through versus recirculation to be controlled.

The temperature of the compartment air is controlled by the heating and cooling unit 6, for example a heat pump using a circulating fluid, whereby its phase transition determines the heating or cooling effect.

Preferably, the sensor unit 2, the control and communication unit 3 and the HVAC control unit 4 are physically separate devices adapted to be installed in any vehicle for compartment air quality control.

As described above at least two distinguished settings of the HVAC may be identified, the air intake mode wherein the valves 7a, 7c, 7b, 7d and fan 5 are arranged to direct external air into the compartment and the recirculation mode wherein the valves 7a, 7c, 7b, 7d and 5 are arranged to circulate the air in the vehicle compartment without, or at least very limited, intake of external air. As appreciated by the skilled person a modern HVAC system may provide a plurality of other different modes to provide air streams towards the windshield, the feet of the driver etc. However, for the purpose of this application it is sufficient to distinguish between the recirculation mode and the air intake mode.

Figure 2A:
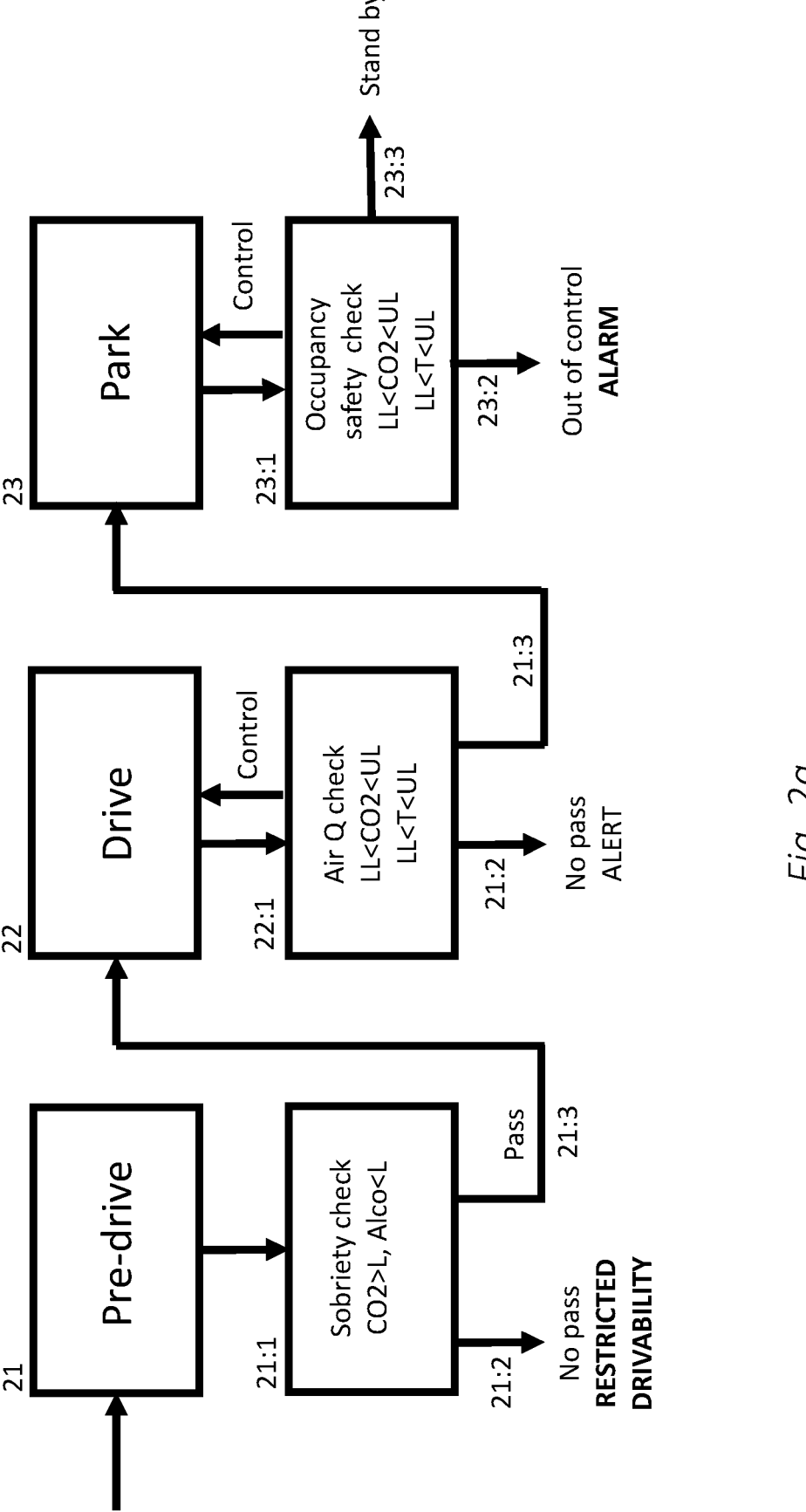
FIG. 2a is a flowchart of the method and its major steps according to the present invention, and FIG. 2b-d schematically depicts typical timing diagrams of the major steps.
Figure 2B:
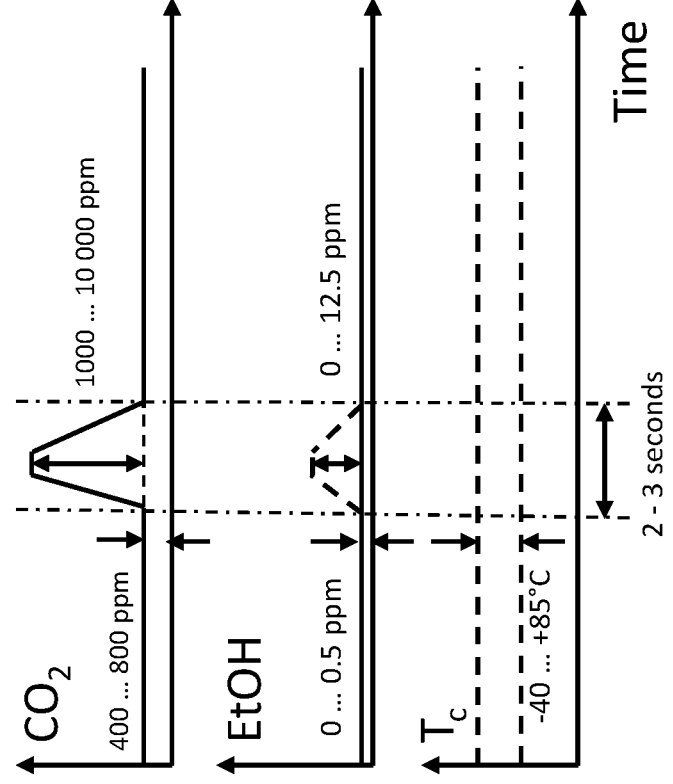

FIG. 2 schematically illustrates the method according to the invention, including three major modes of operation, each with a separate purpose of monitoring and control. The major steps or functional modes and their relation to the system configuration are illustrated in FIG. 2a, whereas more detailed timing diagrams of each of the three major steps are shown in FIG. 2b-d. The method is preferably performed with the system described with reference to FIG. 1 and utilizing the sensor arrangements described with references to FIGS. 3 *a-b* and 4 *a-d*.

The first pre-drive mode 21 illustrated in FIG. 2a is entered when a driver is unlocking and entering the driver's position of the vehicle. The sensor unit is activated, and recordings of temperature, $CO_2$, and EtOH concentration, are taking place with the purpose of checking the sobriety of the driver. A $CO_2$ is an indication of an expired breath, and if accompanied by a correlating EtOH peak above a predetermined value, an alarm signal is generated to indicate that the driver may be intoxicated. If the concentration of EtOH is below a predetermined value, the driver may be deemed to be sober and allowed to start the vehicle.

The pre-drive mode comprises the steps:

21:1 the sensor unit 2 determining the concentration of an intoxicating substance relating to the driver utilizing a tracer substance, preferably $CO_2$, wherein the determination requires the $CO_2$ concentration to be above a predetermined level $L_1$. This level must be exceeded to determine breath alcohol concentration (BrAC) according to the equation $$BrAC = EtOH*(CO_{2et}/CO_{2meas}) \qquad (1)$$

where $CO_{2meas}$ is the measured $CO_2$ concentration by the sensor, and $CO_{2et}$ is the end tidal breath concentration of $CO_2$, typically 4% or 40 000 ppm in a normal adult person. The ratio ($CO_{2et}/CO_{2meas}$) may be referred to as the dilution factor DF of the breath sample. If this factor is above a predetermined value, the accuracy of the BrAC determination will be insufficient.

21:2. if the determined breath concentration BrAC is above a predetermined value $L_2$, the CCU may initiate immobilization or restricted drivability of the vehicle by means affecting the functioning of the throttle, gear box or other components of a vehicle driven by fossil fuels, and the electronic driving control unit of an electric vehicle;

21:3 if the determined concentration of EtOH is below a predetermined value $L_2$ the system will enter the drive mode.

The drive mode 22 is entered when and only when the vehicle is being driven. It has different objectives compared to the pre-drive mode. The intention is to maintain the $CO_2$ concentration and temperature at or below predetermined level (or within range). The level taking in comfort, safety and economic aspects. It has been established that the cognitive functioning of the human brain is deteriorated at high $CO_2$ concentration and high temperature. On the other hand, the power consumption of an HVAC system operating at full speed and at a compartment temperature far from the ambient is highly power consuming. Therefore, these effects should be balanced by careful air flow control. The total power consumption $P_{tot}$ of the vehicle can be described by the following equation:

$$P_{tot} = P_{drive} + P_{HVAC} \qquad (2)$$

in which $P_{drive}$ is the power consumption of the vehicle engine, and $P_{HVAC}$ is the power consumption required to maintain healthy and comfortable conditions inside the vehicle. At extreme external conditions, $P_{HVAC}$ will be an appreciable part of $P_{tot}$, and a compromise with respect to comfort may be necessary.

The drive mode comprises the steps:

22:1 the sensor unit 2 continuously, or semi continuously, monitors the air quality of the air in the vehicle compartment at least by determining the $CO_2$ concentration. If the $CO_2$ concentration is above a predetermined value, $UL_1$ the CCU 3 will communicate with the HVAC control unit 4 to increase the amount of ventilation, i.e. increase the intake of external air. If the CO2 concentration is below a predetermined value, $LL_1$ the CCU 3 will communicate with the HVAC control unit 4 to decrease the amount of ventilation or change to recirculation. This is in order to balance the operation of the HVAC system to provide good enough air quality yet not increase its energy consumption unnecessarily high. In the same manner the temperature of the compartment air may be determined, by sensor unit 2, or another sensor, and the HVAC system controlled so that the temperature is held within a temperature range $LL_2 < T < UL_2$, typically controllable by the driver. In addition, the control algorithm preferably comprises terms corresponding to the time derivative of the $CO_2$ and temperature sensor signals, such that sharply increasing $CO_2$ and temperature levels will be mitigated. According to one embodiment the method utilizes at least one further upper level $ULH_1$ for the $CO_2$ concentration and/or for the temperature $ULH_2$, for use in extreme conditions and which represents a temperature/$CO_2$ concentration which causes some discomfort, however still is within the safe region with regards to the drivers ability to perform the driving operations. Typically, this safety level is not possible for the driver to override, even if maintaining these levels would mean that the drive range would be effected.

The drive mode may further comprise the sensor unit 2 checking the sobriety of the driver by performing the same determination as described in step 21:1. The sobriety check is preferably performed at regular interval while the system is in drive mode.

22:2. According to one embodiment, if the HVAC system is not capable of keeping the $CO_2$ below the predetermined upper limit value, $UL_1$ the CCU initiates an alarm action, for example issuing an alarm signal. The alarm signal may be accompanied with an instruction such as "open window" or "take a break to vent out vehicle". Also automated actions may be envisaged such as automatically open a window close to the driver.

22:3 if the CCU 3 detects that the driving session has ended the system may enter a park mode. The information is provided to the CCU 3 from other parts of the vehicle and may include but is not limited to, the ignition being turned off, the driver has left the drivers seat, the vehicle is locked from the outside/remotely etc.

The park mode is entered when the vehicle has reached a final or temporary destination and the CCU has received information that the vehicle is parked. Then the temperature and $CO_2$ concentration is being monitored with the purpose of detecting any child or pet being left behind and locked within the vehicle and if the temperature rises to dangerous levels. The HVAC system may be put into operation as long as there is power available. If not, the control and communication unit will activate and transmit an alarm signal for appropriate action to be taken. Actions may also be automatically activated.

The park mode comprises the steps:

23:1 the sensor unit 2 continuously, or semi continuously, monitors the air quality of the air in the vehicle compartment at least by determining the $CO_2$ concentration. If the $CO_2$ concentration is above a predetermined value, $UL_3$ the CCU 3 will communicate with the HVAC control unit 4 to increase the amount of ventilation, i.e. increase the intake of external air. If the $CO_2$ concentration is below a predetermined value, $LL_3$ the CCU 3 will communicate with the HVAC control unit 4 to decrease the amount of ventilation or change to recirculation. This is in order to balance the operation of the HVAC system to provide good enough air quality yet not increase its energy consumption unnecessary high. This is of particulate importance in the park mode since the HVAC system is typically running on battery and the time it can operate is limited. In the same manner the temperature of the compartment air may be determined, by sensor unit 2, or another sensor, and the HVAC system controlled so that the temperature is held within a temperature range $LL_2<T<UL_2$, typically controllable by the driver.

23:2 if the HVAC system is not capable of keeping the $CO_2$ below the predetermined upper limit value, $UL_3$ the CCU 3 initiates alarm functions, for example issue an alarm signal. The alarm signal may be an external signal to attract persons outside of the vehicle or linked to for example a mobile phone of the driver/owner or to an alarm and emergency call center. Such an alarm message me be direct to a single person, for example the driver, a selected group and/or in a chain starting with for example the driver and ending with an emergency call center. The alarm signal may be accompanied with other actions such as automatically opening a window or unlocking a door. Preferably, the CCU 3 also monitors or is informed of the battery status of the vehicle, in particular the power available to operate the HVAC system at the required level, and the alarm function may be activated on due to the available power becoming too low. The alarm function should be initiated well before completely running out of battery power in order for the actions associated with alarm function to be performed.

Alternatively, or in combination with monitoring and keeping the $CO_2$ concentration below the predetermined upper limit value, $UL_3$ an increase in the $CO_2$ concentration could be taken as an indication of a presence of a child or pet being left behind in the vehicle. If the rate of change of the $CO_2$ concentration is above a predetermined value an indication or alarm may be issued without the concentration being above the predetermined upper limit value, $UL_3$.

23:3 an optional step may be provided wherein the system is placed in a standby mode. The standby mode should be activated only if there are clear indications that no humans or animals are in the vehicle compartment. The clear indication being at least that the $CO_2$ level has not increased during a predetermined time period. During the standby mode the $CO_2$ level is determined less frequently than in the previous steps and the HVAC system may not be activated or activated only if needed to perform the determination of the $CO_2$ level.

The sequence Pre-drive mode—Drive mode—Park mode is typically restarted when the driver reenters the vehicle after parking.

The upper and lower levels for $CO_2$ and temperature discussed above are typically different in the different mode of operations. The levels may be adjustable by the driver/user, but typically only within certain limits as to not risk that the driver/user by mistake or ignorance sets a level that is potentially dangerous.

FIGS. 2*b-d* are timing diagram examples of the predrive, drive, and park modes, respectively. The predrive mode in FIG. 2*b* is typically performed within a few seconds before starting the vehicle by contactless measuring of the $CO_2$ and EtOH concentration of the driver's exhaled breath and by determining BrAC from these signals according to eq. (1), using signals from the sensor unit 2. Typically, the $CO_2$ signal exhibits a peak coinciding with the exhaled breath. The background $CO_2$ level is typically 400 . . . 800 ppm (volume parts per million) depending on environmental conditions. The magnitude of the $CO_2$ peak will be 1000 . . . 10 000 ppm, depending on the dilution factor DH as previously described. Prevalence of alcohol in the driver's breath will give rise to a coinciding EtOH peak from a background level of 0 . . . 0.5 ppm. The peak magnitude 0 . . . 12.5 ppm may vary according to the driver's BrAC level and the dilution factor. The drivability of the vehicle will be controlled by the driver BrAC level determined by eq. (1) in relation to the legal concentration limit. If the legal limit is exceeded, drivability will be restricted, or may even be totally disabled. Before the vehicle's engine and HVAC system are being started, the compartment temperature measured by the sensor will correspond to ambient temperature which may vary from very cold to very hot, exemplified by the interval −40 . . . +85° C., which is the accepted interval used by the automotive industry.

A typical timing diagram of the drive mode is shown in FIG. 2c. The time extension of 10 . . . 120 minutes corresponding to a driving session before break is much larger than the predrive mode. In this mode, the conditions within the vehicle compartment are expected to be controlled by the HVAC system to maintain safe and comfortable levels of $CO_2$, EtOH, concentration and temperature corresponding to 400 . . . 800 ppm, 0 . . . 0.5 ppm, and 18 . . . 25° C., respectively. Departure from these levels as illustrated in FIG. 2c by steadily increasing values, eventually reaching 2000 ppm, 12.5 ppm, and 30° C., may be used to alert the driver or passengers that safety limits may be approached or exceeded. The responsibility for taking action is mainly on the side of the driver. For safety reason, the recommended action is to park the vehicle at the nearest convenient location to take a rest.

As indicated in FIG. 2d, the park mode is similar to the drive mode, but there are also important differences. In the park mode, the driver is not expected to be immediately present, and the main function of the system and method according to the invention is to issue an alarm if life-threatening conditions may occur to a child or a pet left behind inside a parked and locked vehicle. As already described in relation to FIG. 2a, audible and visual alarms will be issued when (i) a steadily increasing $CO_2$ concentration from a background level of 400 . . . 800 ppm is indicating that someone is breathing inside the closed vehicle compartment, and (ii) an accompanying increase in the compartment temperature towards life-threatening levels exceeding 50° C. due to high environmental temperature or high incident sun radiation. At moderate levels, the vehicle HVAC system may be activated as long as sufficient power for cooling is available. There will be a trade-off between available power and the most feasible mitigation and alarm actions. The available decision-tree for the system to manage, should comprise several options in which available power, location, access to the vehicle owner/driver, or other persons who may be of help.

Figure 3:
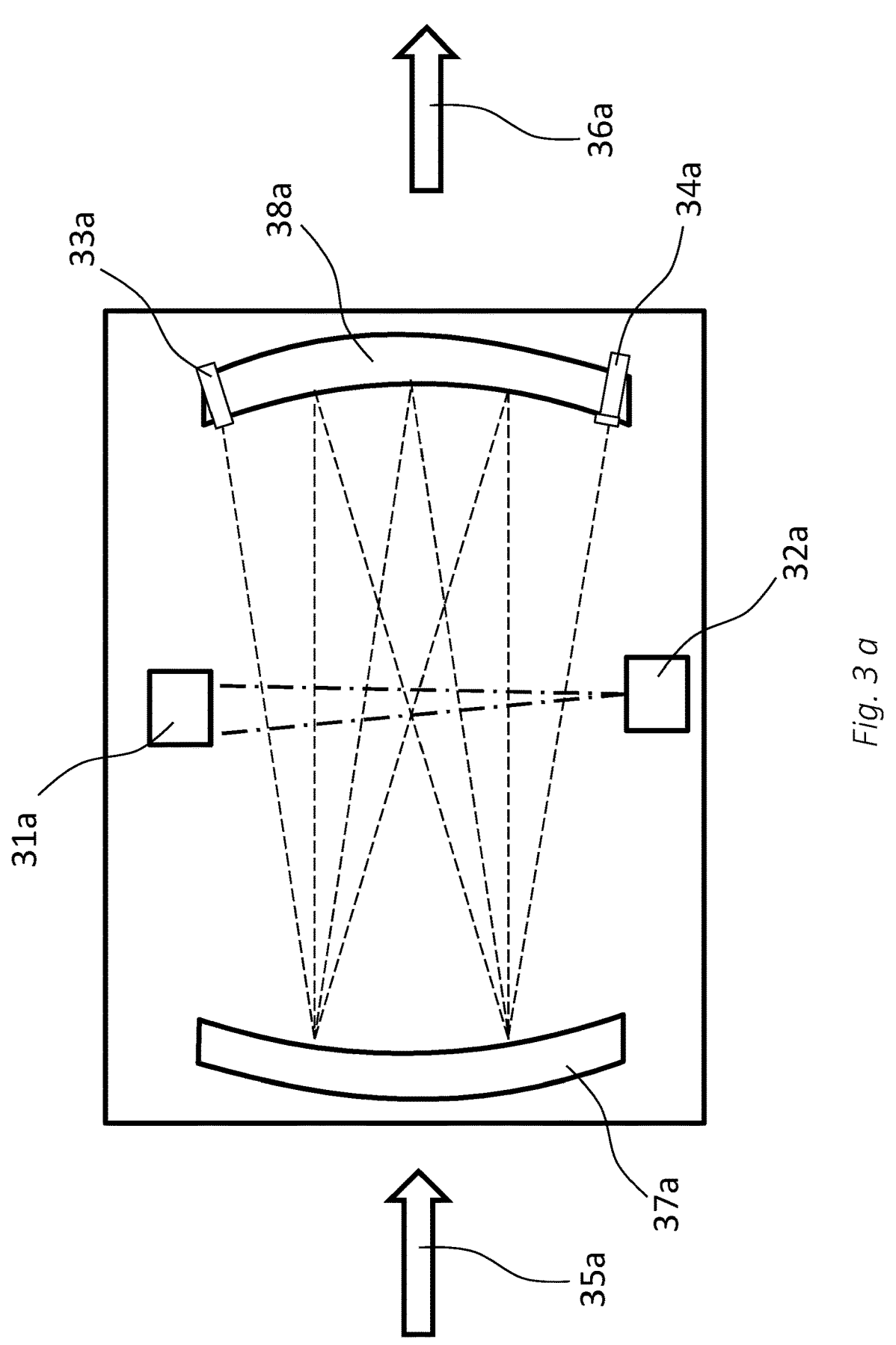
FIG. 3a-b are schematic illustrations of the sensor unit according to the present invention using a) rectilinear and b) coinciding IR beam patterns for $CO_2$ and EtOH sensing.
Figure 3:
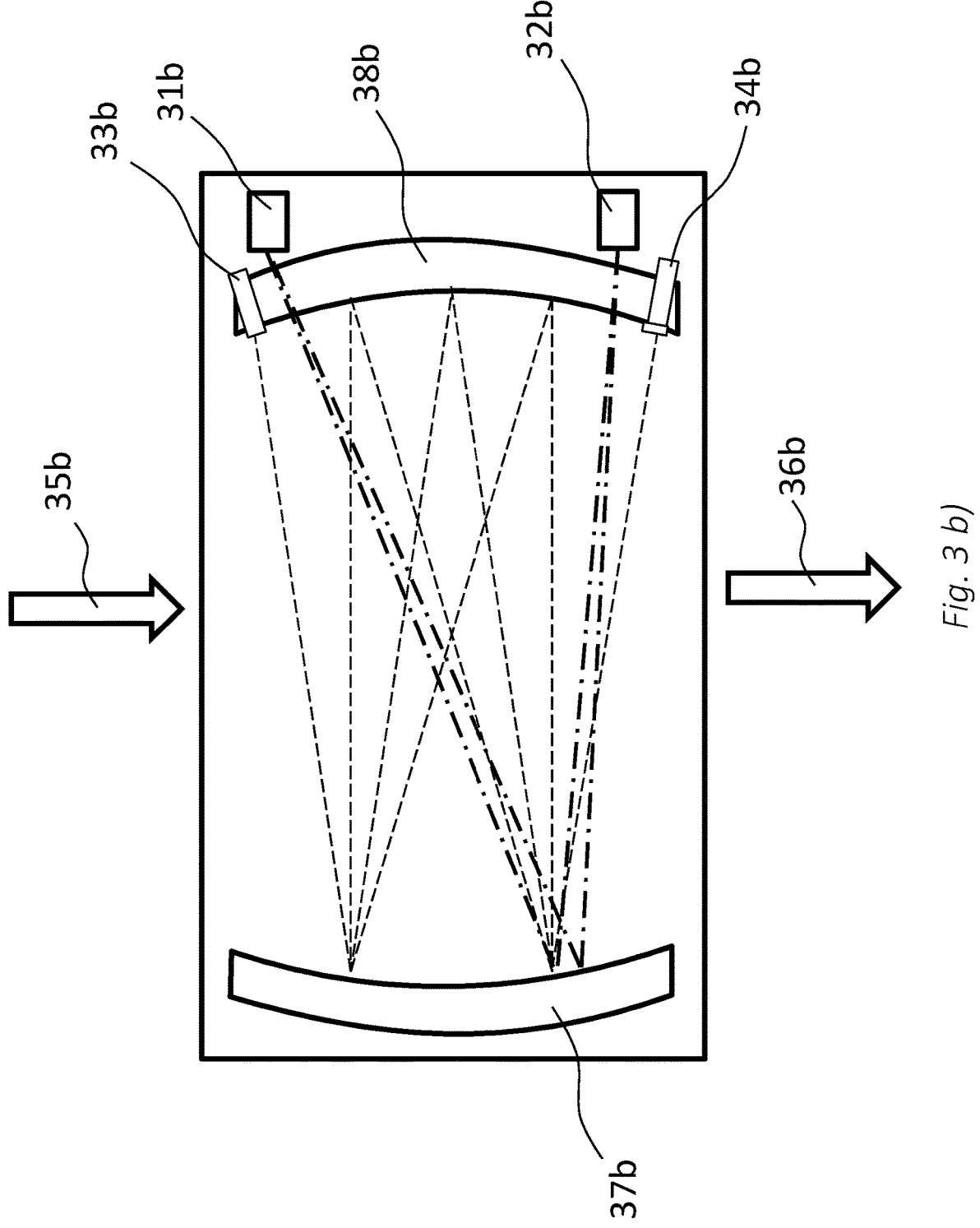

The sensor unit 2 according to the invention is designed to measure at least a first target substance and a tracer substance, wherein the tracer substance is also, and by itself, a measure of the air quality. FIG. 3 shows two embodiments of the sensor unit 2 with respect to optical design. Both embodiments make use of infrared (IR) spectroscopy, and measurement of IR transmission from a source to a detector after passing an optical path. The detailed configurations are designed with the specific requirements on signal resolution which in turn is based on the range of concentrations in the $CO_2$ and EtOH regimes.

In FIG. 3 a) an emitter 31a is directing its IR beam towards a detector 32a located at the opposite side of the sensor unit housing. The emitter is typically an incandescent lamp generating IR radiation similar to an ideal black body heated by passing current through a tungsten wire. The detector 32a is typically a photovoltaic cell including an interference bandpass filter centered to the $CO_2$ absorption peak at 4.23 μm. The emitter 31a is typically modulated at 5 Hz repetition rate.

The corresponding arrangement for EtOH detection includes a MEMS (micro electro-mechanical system) emitter 33a including a very thin membrane emitting IR radiation at longer wavelengths compared to the $CO_2$ emitter 31a. Both emitters 31a and 33a operate synchronously with a repetition rate of 5 Hz. The EtOH detector 34a is typically a pyroelectric device, including an interference bandpass filter designed for 9.5 μm absorption peak of EtOH.

The optical path for EtOH detection is typically 50-100 cm in length compared to 2-4 cm for the corresponding $CO_2$ path. By using two mirrors and a dedicated reflection pattern by concave mirrors 37a and 38a, the EtOH path can be incorporated in a small housing.

In FIG. 3 a) the optical path directions for $CO_2$ and EtOH are rectilinear, whereas they are coinciding in FIG. 3 b). The gas inlet and outlet flow 35a, 36a through the sensor housing coincides in FIG. 3 a) whereas the corresponding flow pattern 35b, 36b is rectilinear to the optical path in FIG. 3 b).

FIG. 4a-c shows in some detail three embodiments of the sensor unit housing with respect to flow pattern. In all three embodiments, there is an inlet heater 41a-c with the main purpose of preventing condensation if the input air is highly humid. The main air flow through the sensor housing is depicted by the flow lines 42a-c, and flow is driven by a small radial fan 43a-c located at the backend of the flow. The flow in the 4 a) and 4 b) embodiments correspond to the optical design shown in FIG. 3 a) whereas the 4 c) flow pattern is rectilinear to the main optical path, corresponding to the optical design of FIG. 3 b).

The sensor unit 2 is preferably provided with at least one temperature sensor. Thereby $CO_2$ and EtOH and temperature may be determined simultaneously and in the same airflow. Preferably, the sensor unit 2 is positioned within the vehicle compartment in such a manner that the temperature of the inlet air flow is representative of the compartment temperature. For practical reasons, a piece of tubing may be used to connect the air sampling point with the inlet heater 41a-c (not shown in FIG. 4a-c). This represents an important advantage compared to systems utilizing a plurality of different sensors in terms of providing the accurate and reliable determination required for an effective control of HVAC system and thereby the environment in the vehicle compartment.

The sensor unit 3 may also include other types of sensor such as sensor for humidity, pressure or other supporting data sources.

FIG. 5a-b are graphs shows the sensor signal characteristics of both the a) $CO_2$ and b) EtOH IR detection channels. The $CO_2$ concentration ranges between zero and 5% by volume, approximately limited by the typical concentration of exhaled breath. The sublinear characteristics of the $CO_2$ detector is favorable by allowing high dynamic range between low concentration corresponding to the typical atmospheric concentration level of approximately 400 ppm and the highest expected concentration of approximately 10 000 ppm in expired breath with a low DF level. The EtOH curve is approximately linear within the normal concentration range. 200 ppm corresponds to the US legal limit of 0.08% BAC (blood alcohol concentration).

In both cases, the signal characteristics are depicted within a wide range of operating temperatures, in which the lower and higher curves designated by DT in the respective diagrams corresponds to extreme temperatures, typically in the automotive operating range of −40 . . . +85 degC.

The detailed signal characteristics in both $CO_2$ and EtOH channels varies from one sensor unit individual to another. This is partly due to tolerances on the component level, e g the emitters and detectors being used, and partly due to tolerances in the assembly of the sensor unit. Therefore, each sensor unit individual needs to be calibrated against precisely controlled air mixtures including each one of the two target substances at several concentrations and temperatures within the operating range. To obtain full control of the sensor characteristics, it is imperative to include the entire sensor function within a single enclosure.

The embodiments described above are to be understood as illustrative examples of the system and method of the present invention. It will be understood that those skilled in the art that various modifications, combinations and changes may be made to the embodiments. In particular, different part solutions in the different embodiments can be combined in other configurations, where technically possible.

The invention claimed is:

1. A vehicle mounted combined system for monitoring and controlling air quality of a vehicle compartment and for determining of a target substance relating to a driver/user of the vehicle, the system comprising:

a sensor unit arranged to analyze air from the vehicle compartment and to determine a concentration of the target substance and a concentration of carbon dioxide in an air sample, and wherein the sensor unit is arranged to use carbon dioxide as a tracer substance to determine the concentration of the target substance;

a heat, ventilation and air conditioning system (HVAC system), arranged to have at least one air intake mode drawing external air into the vehicle compartment and one recirculation mode circulating air in the vehicle compartment and the HVAC system configured to regulate a flow and amount of intake air by changing settings of the HVAC system;

a central control unit arranged to control both the sensor unit and the HVAC system, and wherein the central control unit is arranged to set the HVAC system and the sensor unit in at least two different modes of operation:

a pre-drive mode comprising determination of the concentration of the target substance in the air sample using carbon dioxide as the tracer substance;

at least a second mode wherein the air quality of the vehicle compartment is monitored and at least partly controlled by performing carbon dioxide determination and controlling the settings of the HVAC system at least partly based on the carbon dioxide determination; and wherein the sensor unit is arranged to during the pre-drive mode determine the concentration of the target substance in the air sample using carbon dioxide as the tracer substance, and during second mode the sensor unit is arranged to provide a measure of the air quality of the vehicle compartment by determining the carbon dioxide concentration.

2. The combined system according to claim 1, wherein the second mode is a drive mode initiated only if a determined target substance concentration determined in the pre-drive mode is below a predetermined level.

3. The combined system according to claim 2, further comprising a park mode wherein the air quality of the vehicle compartment is monitored and at least partly controlled by performing carbon dioxide determination with the sensor unit and controlling the settings of the HVAC system at least partly based on the carbon dioxide determination performed during the park mode.

4. The combined system according to claim 2, wherein the drive mode comprises the central control unit controlling the HVAC system to increase the intake of external air if a determined carbon dioxide level is above a first predetermined upper level, and reduce the external air intake if the carbon dioxide level is below a first predetermined lower level.

5. The combined system according to claim 4, wherein the drive mode comprises the central control unit activating an alarm function if the HVAC system is not capable of maintaining the carbon dioxide level below the first predetermined upper level.

6. The combined system according to claim 3, wherein the park mode comprises the central control unit controlling the HVAC system to increase the external air intake if a determined carbon dioxide level above a second predetermined upper level, and reduce the external air intake if the carbon dioxide level is below a second predetermined lower level.

7. The combined system according to claim 6, wherein the park mode comprises the central control unit being arranged to monitor a status of a battery supplying the HVAC system with power and activating an alarm function if the battery status indicates that the power will not be enough to maintain the HVAC system at a present setting required for maintaining a carbon oxide level below the second predetermined upper limit.

8. The combined system according to claim 6, further comprising the park mode comprises the central control unit activating an alarm function if the HVAC system is not capable of maintaining the carbon dioxide level below the second predetermined upper level.

9. The combined system according to claim 1, wherein the sensor unit comprises a temperature sensor and the temperature of the air in the vehicle compartment is determined using the sensor unit and the settings of the HVAC system will depend on both the determined temperature and a determined carbon dioxide level.

10. A method of operating a vehicle mounted combined system for monitoring and controlling air quality of a vehicle compartment and for determining of target substance relating to a driver/user of the vehicle, wherein the system comprises:

a sensor unit arranged to analyze air from the vehicle compartment and to determine a concentration of a target substance and the concentration of carbon dioxide in an air sample, and wherein the sensor unit is arranged to use carbon dioxide as a tracer substance to determine the concentration of the target substance;

a heat, ventilation and air conditioning system (HVAC system), arranged to have at least one air intake mode drawing external air into the vehicle compartment and one recirculation mode circulating air in the vehicle compartment and the HVAC system configured to regulate a flow and amount of intake air by changing settings of the HVAC system, and a central control unit arranged to control both the sensor unit and the HVAC system, and wherein the central control unit is arranged to set the HVAC system and the sensor unit in at least two different modes of operation, the method comprises steps of:

in a pre-drive mode, determining the concentration of the target substance in the air sample using carbon dioxide as the tracer substance using the sensor unit;

in at least a second mode, monitoring the air quality of the vehicle compartment and at least partly by performing carbon dioxide determination and using the sensor unit and controlling the settings of the HVAC system at least partly based on the carbon dioxide determination.

11. The method according to claim 10, wherein the second mode is a drive mode initiated only if the determined target substance concentration determined in the pre-drive mode is below a predetermined level.

12. The method according to claim 11, further comprising a park mode wherein the air quality of the vehicle compartment is monitored and at least partly controlled by performing carbon dioxide determination with a same sensor unit and controlling the settings of the HVAC system at least partly based on the carbon dioxide determination performed during the park mode.

13. The method according to claim 11, wherein the drive mode comprises the central control unit controlling the HVAC system to increase an intake of external air if the determined carbon dioxide level is above a first predetermined upper level, and reduce the intake of external air if the carbon dioxide level is below a first predetermined lower level.

14. The method according to claim 13, wherein the drive mode comprises the central control unit activating an alarm function if the HVAC system is not capable of maintaining the carbon dioxide level below the first predetermined upper level.

15. The method according to claim 12, wherein the park mode comprises the central control unit controlling the HVAC system to increase the external air intake if the determined carbon dioxide level is above a second predetermined upper level, and reduce the external air intake if the carbon dioxide level is below a second predetermined lower level.

16. The method according to claim 15, wherein the park mode comprises the central control unit monitors a status of a battery suppling the HVAC system with power and activating an alarm function if the battery status indicates that the power will not be enough to maintain the HVAC system at a present setting required for maintaining a carbon oxide level below the second predetermined upper level.

17. The method according to claim 16, further comprising the park mode comprises the central control unit activating an alarm function if the HVAC system is not capable of maintaining the carbon dioxide level below the second predetermined upper level.

18. The method according to claim 12, wherein the sensor unit provides a temperature of the air in the vehicle compartment and the settings of the HVAC system will depend on both a determined temperature and the determined carbon dioxide level.

\* \* \* \* \*